United States Patent [19]

Muramatsu et al.

[11] Patent Number: 5,038,337
[45] Date of Patent: Aug. 6, 1991

[54] DISC LOADING MECHANISM

[75] Inventors: Hidenori Muramatsu; Yuji Teraguchi, both of Tokyo, Japan

[73] Assignee: Clarion Co., Ltd., Tokyo, Japan

[21] Appl. No.: 461,991

[22] Filed: Jan. 8, 1990

[30] Foreign Application Priority Data

Jan. 9, 1989 [JP] Japan ..................................... 1-2184

[51] Int. Cl.⁵ ........................................... G11B 25/04
[52] U.S. Cl. ................................... 369/77.1; 369/75.2
[58] Field of Search ................... 369/75.1, 75.2, 77.1, 369/77.2, 291; 360/99.02, 99.03, 99.06, 99.07, 92

[56] References Cited

U.S. PATENT DOCUMENTS

| | | | |
|---|---|---|---|
| 4,098,510 | 7/1978 | Suzuki et al. | 369/75.1 |
| 4,580,256 | 4/1986 | Inaba et al. | 369/194 X |
| 4,839,880 | 6/1989 | D'Alayer et al. | 369/75.2 |

Primary Examiner—Stuart S. Levy
Assistant Examiner—Kenneth B. Wells
Attorney, Agent, or Firm—Flynn, Thiel, Boutell & Tanis

[57] ABSTRACT

A disc loading mechanism for use in a CD player, laser disc player, etc. includes sensors for judging the size of an inserted disc to use the judging result to automatically set the disc in a proper position on a turn table.

12 Claims, 9 Drawing Sheets

DISC LOADING MECHANISM

FIELD OF THE INVENTION

This invention relates to a disc-using electric apparatus such as compact disc player, laser disc player, etc., and more particularly to a disc loading mechanism for loading the disc on a turn table in the electric apparatus.

BACKGROUND OF THE INVENTION

In accordance with recent varieties of consumer's needs, small-diameter compact discs (hereinafter called CD) of 8 cm standard have widely been distributed in addition to those of 12 cm standard. Therefore, CD players are required to be available for discs of large and small two sizes, small-scaled, simply arranged and excellent in operability.

There is a disc loading mechanism shown in FIG. 9 configured to automatically convey a disc and position it on a turn table in a CD player for discs of the existing 12 cm standard.

In the mechanism of FIG. 9, a driving roller 24 is disposed in a side of the turn table 22 of the CD player 21 nearer to a disc insertion aperture 23 (lower side in the drawing). As shown in FIG. 10, the driving roller 24 and a support member 25 opposed thereto sandwich the inserted disc 26, and the driving roller 24 is rotated to convey the disc 26 until the front outer edge of the disc 26 engages positioning projections 27 provided in two different front positions (upper positions in the drawing) in the convey path. Thus the disc 26 is set in a proper position on the turn table, with the center hole 26a of the disc 26 engaging with the center of the turn table.

The disc loading mechanism of FIG. 9, however, can accept large-diameter discs of 12 cm standard alone. Therefore, in order to use a small-diameter disc of 8 cm standard in such a 12 cm standard player, an adapter is required to conform the 8 cm disc with the 12 cm standard.

The above-indicated disadvantage is not limited to CD players alone, but is common to various disc players, in general, in which the use of discs of large and small two sizes is desired.

Thus the existing disc loading mechanism is poor in operability because of its unavailability for discs of both large and small sizes unless an adapter is used.

OBJECT OF THE INVENTION

It is therefore an object of the invention to provide a simply-arranged disc loading mechanism excellent in operability in such a manner that it can automatically convey, position and set discs of large and small two kinds of diameters, without using an adapter.

SUMMARY OF THE INVENTION

An inventive disc loading mechanism comprises:
conveyor means for loading a disc on a turn table;
judging means for judging the size of said disc;
a solenoid energized and deenergized by instructions from said judging means;
two stopper arms supported pivotably and having stopper portions engageable with said disc; and
regulating means responsive to energization and deenergization of said solenoid to regulate pivotal positions of said stopper arms.

In the above-specified invention, the judging means judges the size of a disc and energizes or deenergizes the solenoid accordingly to automatically position the stopper arm according to the size of the disc. Subsequently, the conveyor means conveys the disc until the disc engages the stopper portions of the stopper arms, and the disc is reliably automatically set in a proper position on the turn table.

BRIEF DESCRIPTION OF THE DRAWINGS

FIGS. 1 through 5 are plan views of the entirety of a disc loading mechanism embodying the invention in which FIG. 1 shows a condition where loading of a small-diameter disc has been completed; FIGS. 2 and 3 show conditions during loading of the small-diameter disc; FIG. 4 shows a condition where loading of a large-diameter disc has been completed; and FIG. 5 shows a condition during loading of the large-diameter disc;

FIGS. 6A through 6C show an arrangement from a solenoid to a stopper arm in the same embodiment in which FIG. 6A is a plan view, FIG. 6B is a front elevation, and FIG. 6C is a bottom view;

FIGS. 7A and 7B show a judging process of judging sensors in the same embodiment in which FIG. 7A is a plan view and FIG. 7B is a side elevation;

DETAILED DESCRIPTION

Figure 7A:
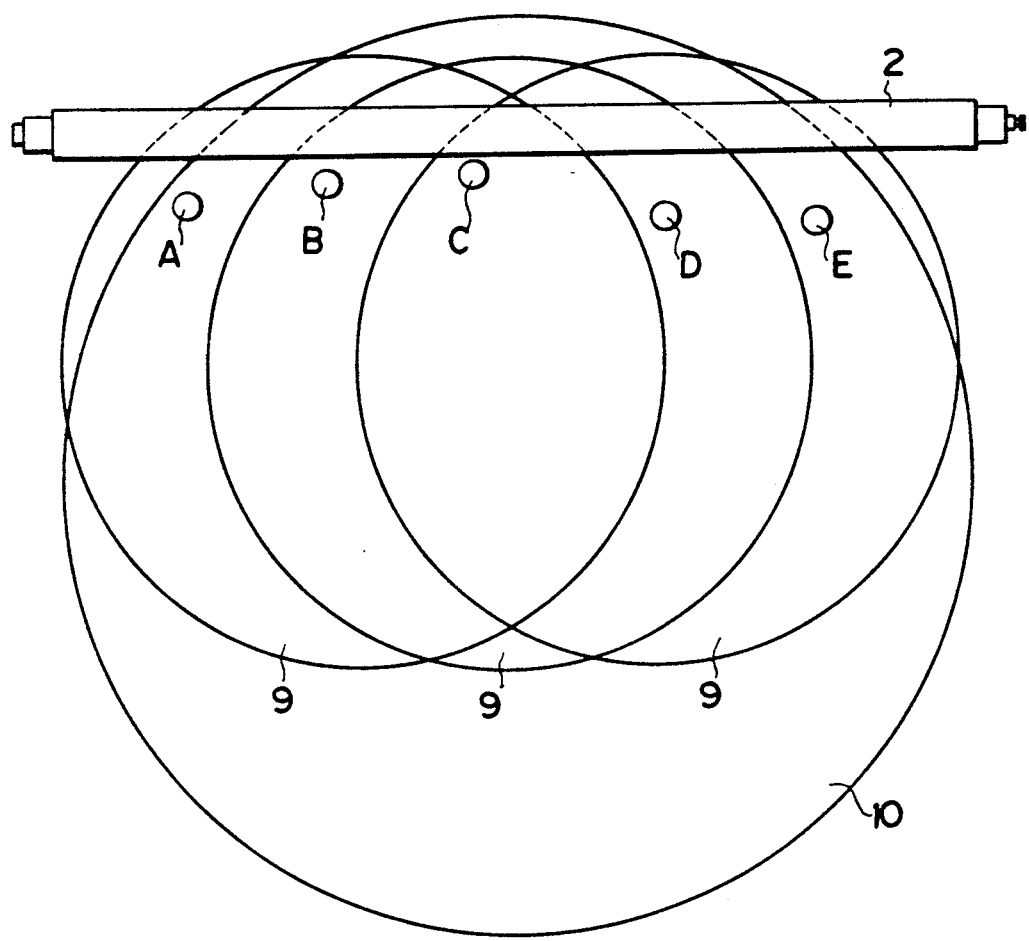
Figure 7B:
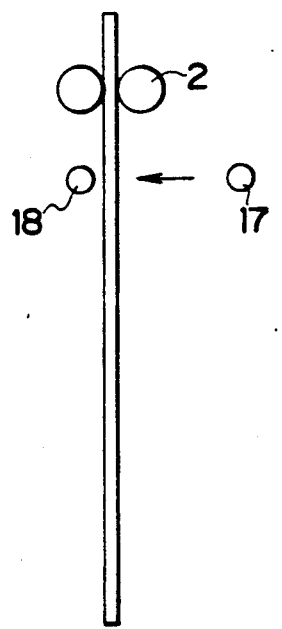
Figure 8:
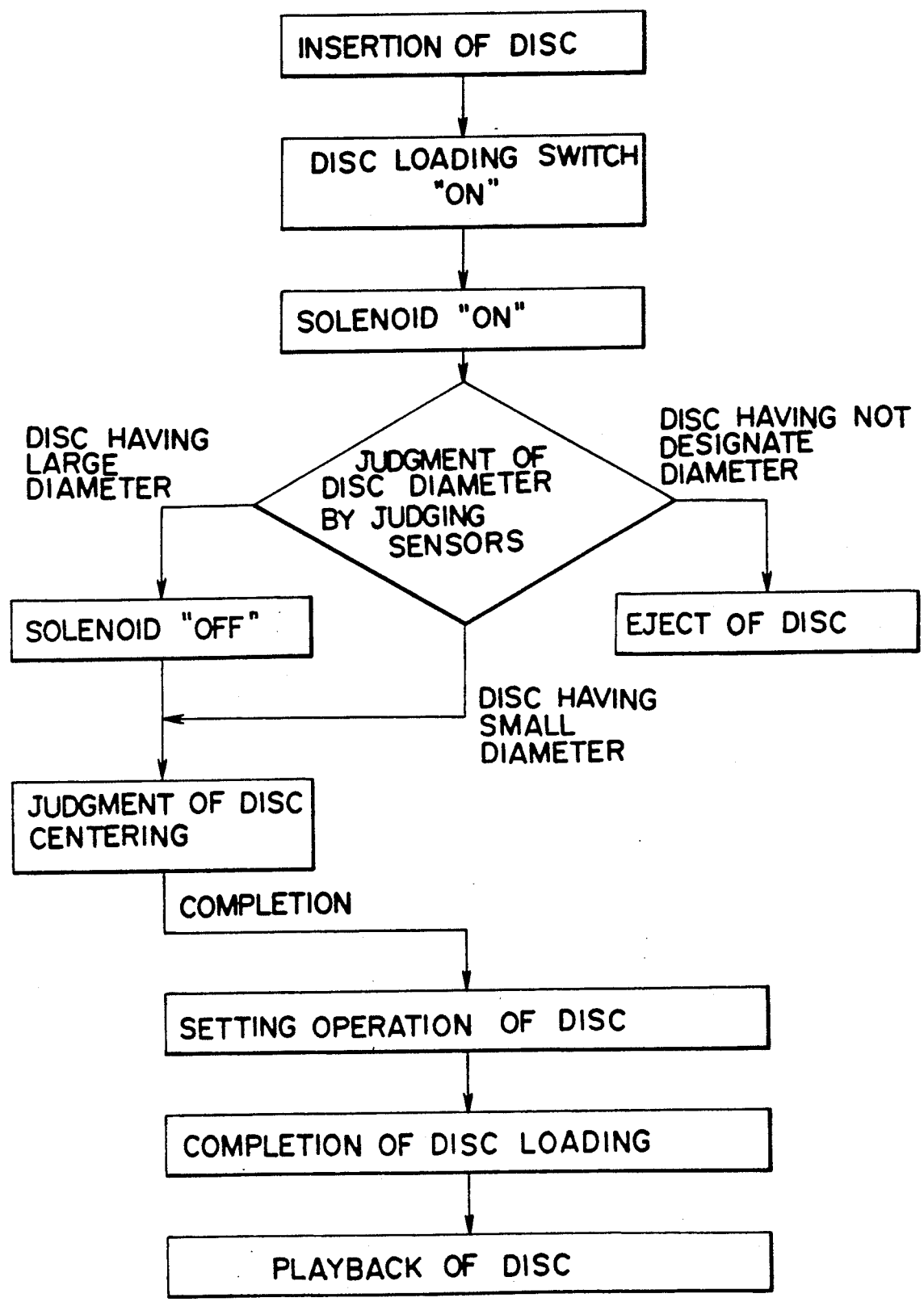
FIG. 8 is an operation flow chart of the same embodiment.
Figure 9:
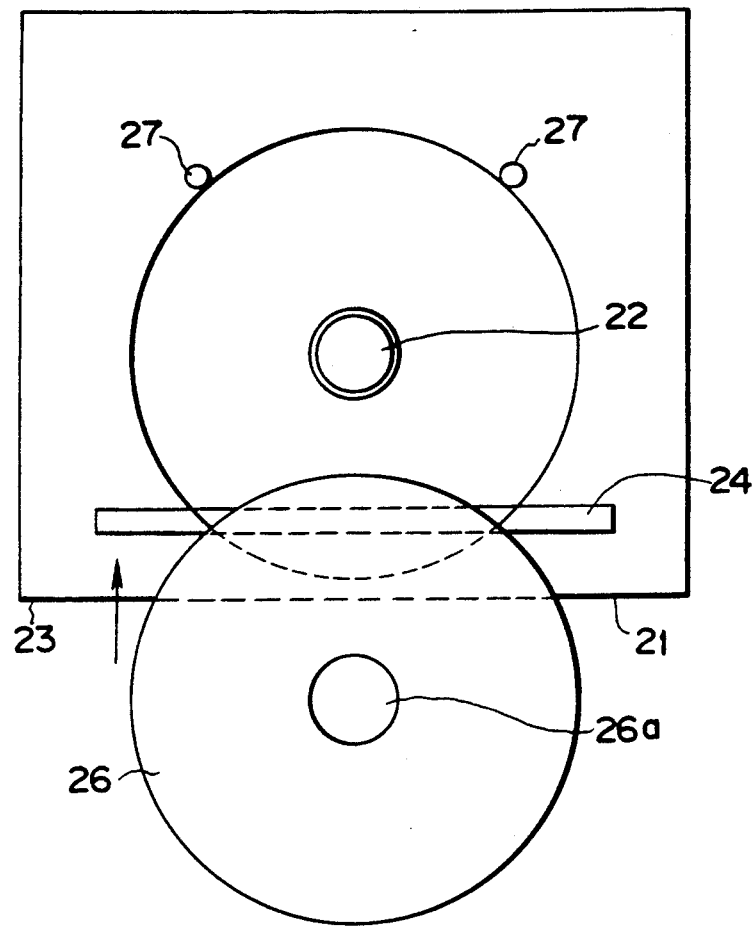
FIGS. 9 and 10 are a plan view and a side elevation of an existing disc loading mechanism.
Figure 10:
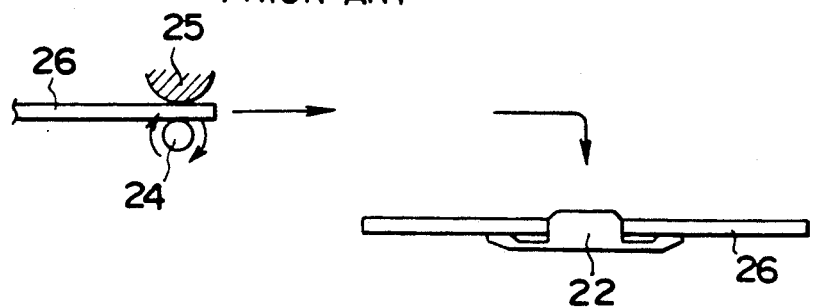

The invention is described below in detail, referring to a preferred embodiment used in a CD player as illustrated in the drawings. FIGS. 1 through 5 are views which show the entirety of the inventive mechanism, FIGS. 6A through 6C are views which show the arrangement from a solenoid to a stopper arm in the same embodiment in a greater detail, FIGS. 7A and 7B are views which show a judging process of judging sensors in the same embodiment; and FIG. 8 is a flow chart of an inventive loading operation.

As shown in FIGS. 1 through 5, at the disc insertion side (lower side in the drawings) of a turn table are disposed a driving roller 2 for driving a disc and five judging sensors for judging the size of the disc diameter.

In the front (upper side in the drawings) of the turn table 1 is disposed a sub-chassis 4, and at the front left end of the sub-chassis 4 is provided a solenoid which is energized or deenergized by instructions of the judging sensors 3. In rear left and right sides of the sub-chassis 4 are pivotably supported stopper arms 6L and 6R by pins 6a, and they are connected via gears 7 thereof so that they symmetrically move in front and rear directions. These stopper arms 6L and 6R are configured to take rear first operative positions shown in FIGS. 2 and 3 where stopper pins 8L and 8R provided at respective ends thereof abut a small-diameter disc 9 to define its setting position, and front second operative positions shown in FIGS. 4 and 5 where the stopper pins 8L and 8R abut a large-diameter disc 10 to define its setting position.

Figure 2:
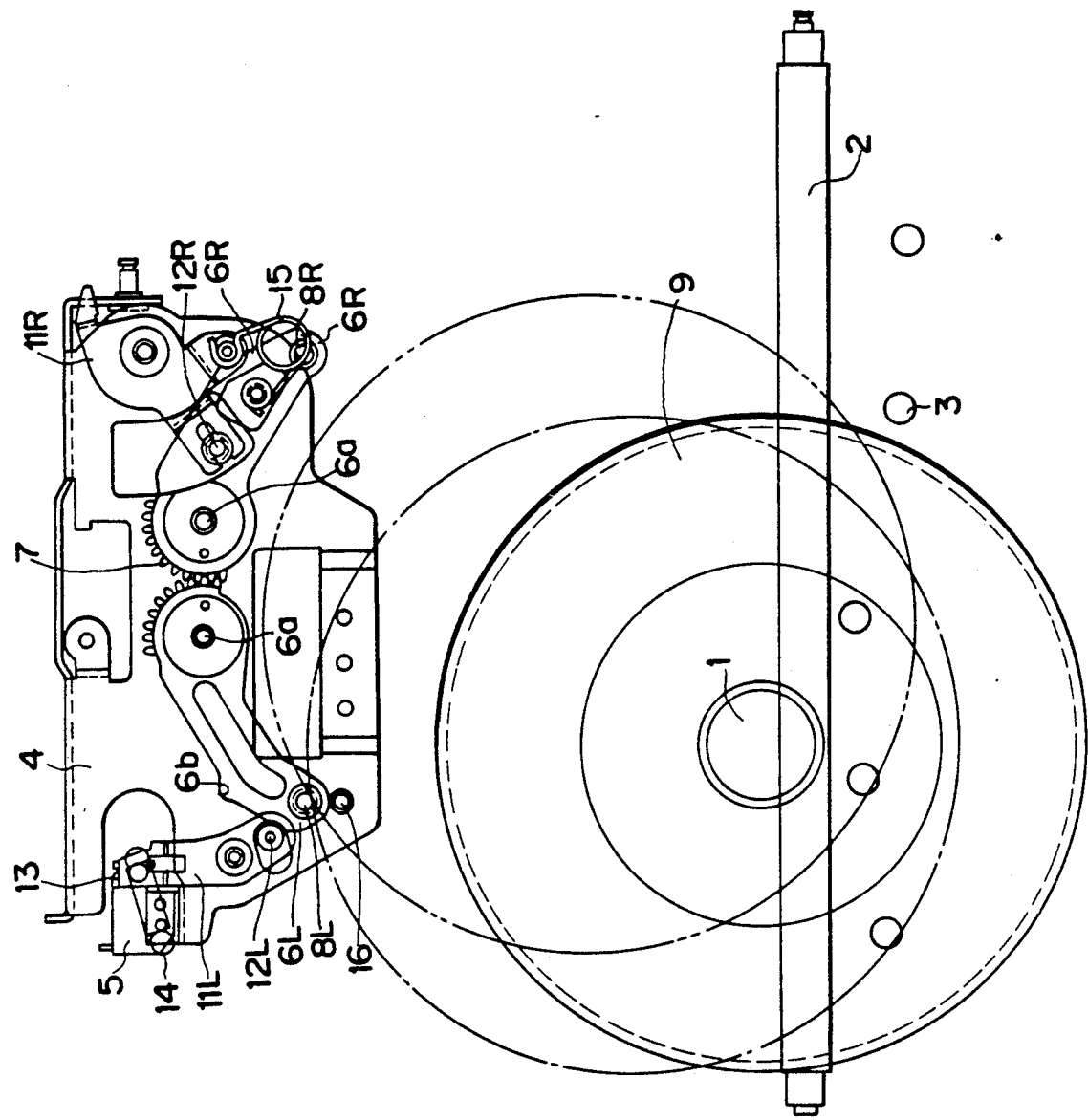
Figure 3:
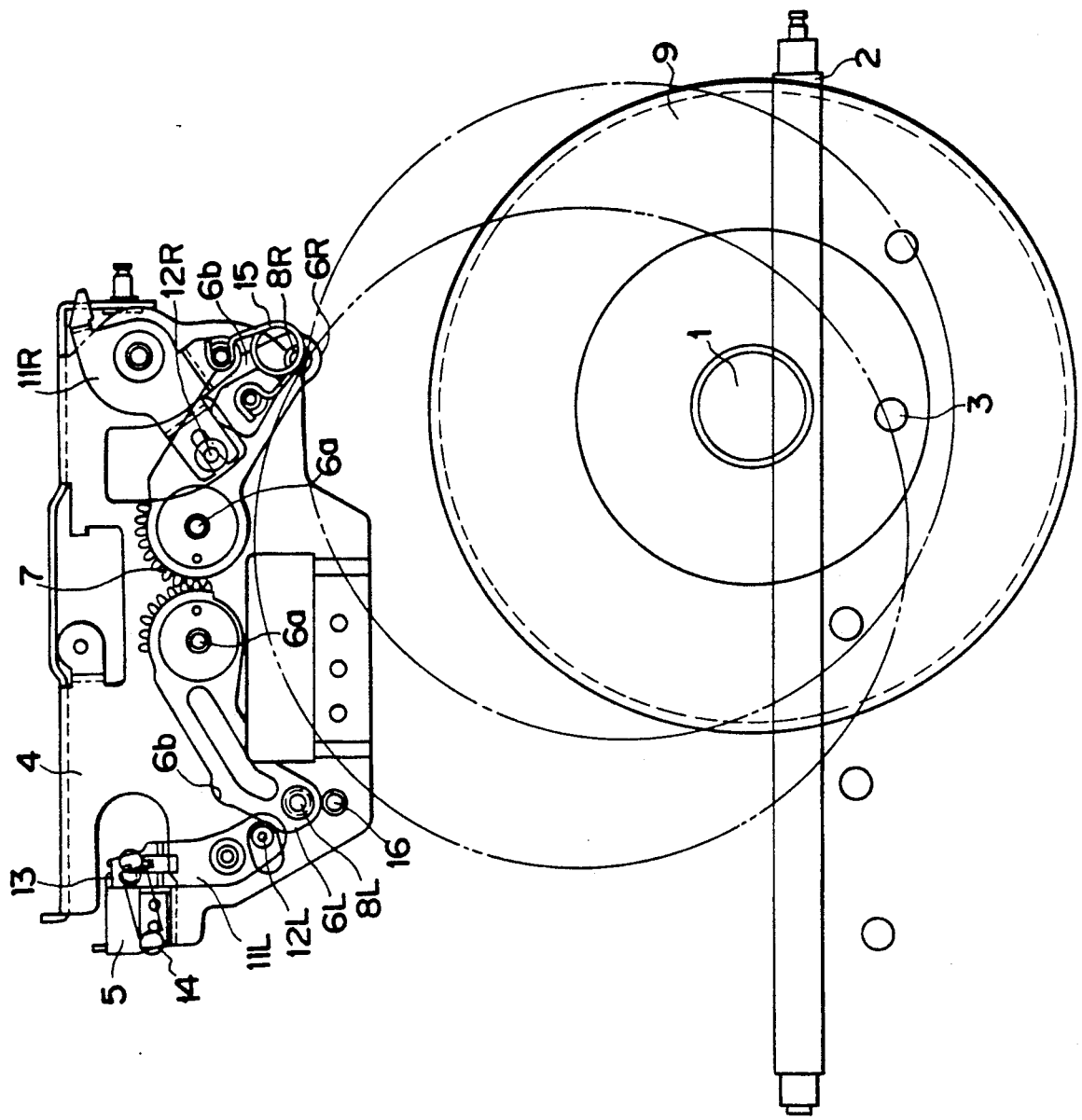
Figure 6A:
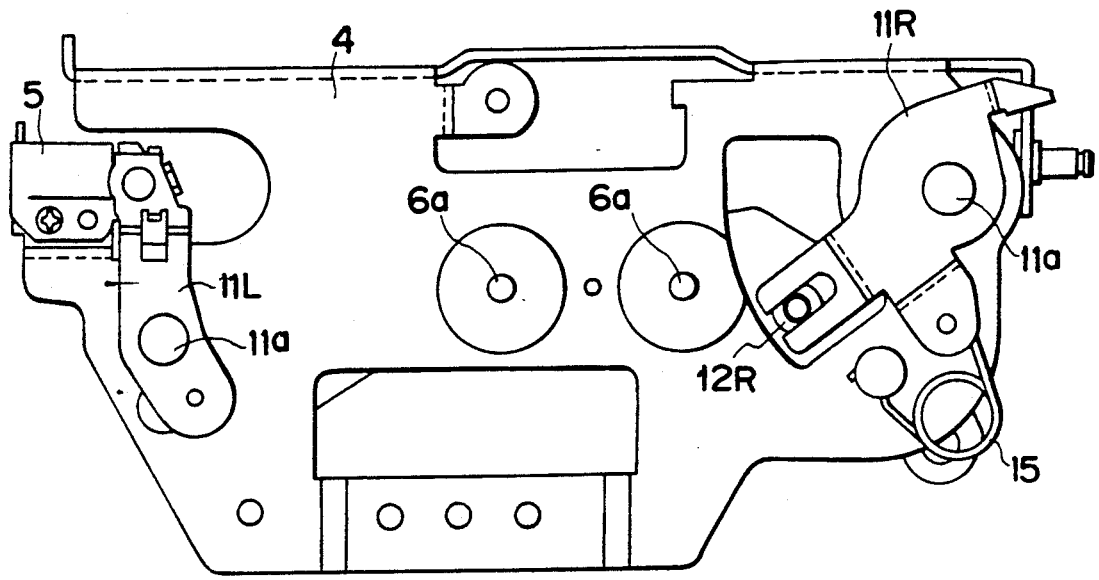
Figure 6B:
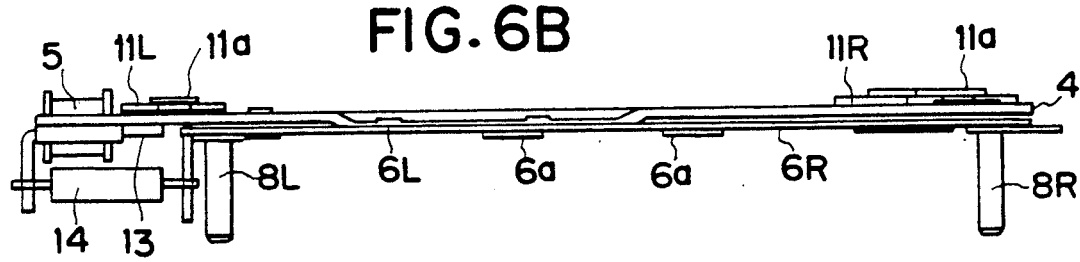
Figure 6C:
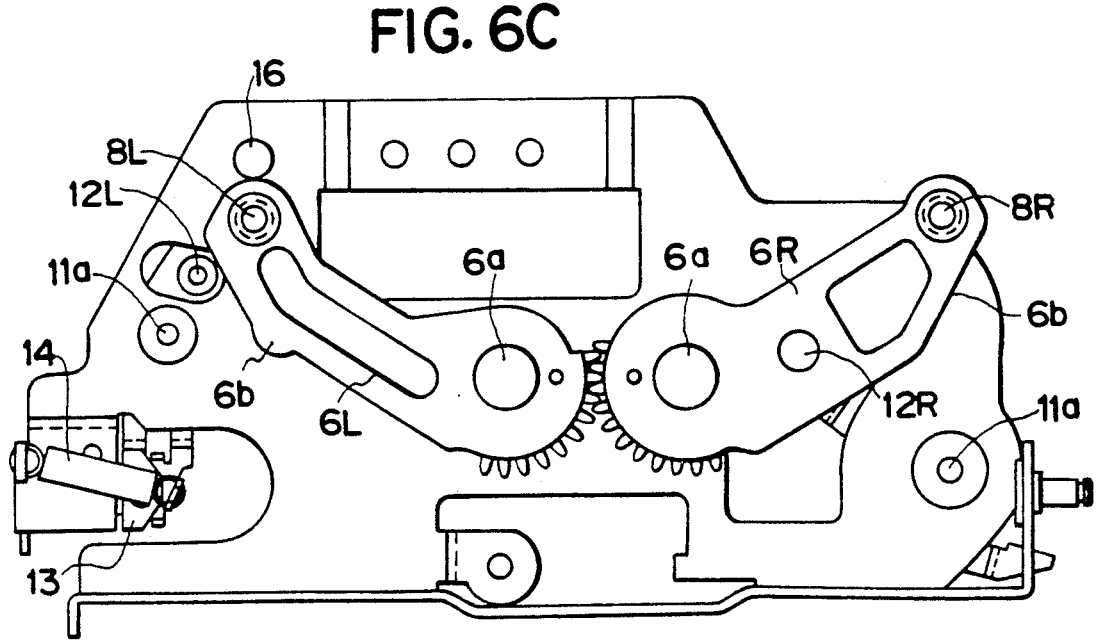

Between the solenoid 5 and the left stopper arm 6L and in a front side of the right stopper arm 6R are pivotably supported left and right pivoting regulating plates 11L and 11R by pins 11a (FIGS. 6A, 6B and 6C). The left pivoting regulating plate 11L has at one end thereof a pivoting regulating pin 12L which engages the stopper arm 6L from its front side to hold it in the rear first operative position. In the right hand of the mechanism, a pivoting regulating pin 12R is provided in a central portion of the stopper arm 6R, and an end portion of the right pivoting regulating plate 11R engages the pivoting regulating pin 12R to be pivoted thereby in response to pivotal movements of the stopper arm 6R. The left pivoting regulating plate 11L is fixed to a movable member 13 of the solenoid 5 and biased by a spring 14 counterclockwise toward attraction by the solenoid 5 so that the solenoid 5, when energized, holds the left pivoting regulating plate 11L in the pivoting regulating position (counterclockwise direction) shown in FIGS. 2 and 3 to hold the left stopper arm 6L in the rear first operative position while the solenoid 5, when deenergized, permits the left pivoting regulating plate 11L to pivot to a position where it permits the left stopper arm 6L to pivot to the second operative position. On the other hand, on an end of the right pivoting regulating plate 11R is fixed an end of an inversion spring 15 whose other end is fixed on the sub-chassis 4. When the right pivoting regulating plate 11R is located in a position nearer to the pivoting regulating position (counterclockwise direction) with respect to the approximately central position of its pivoting stroke as shown in FIGS. 2 and 3, the inversion spring 15 further biases it counterclockwisely. In contrast, when the right pivoting regulating plate 11R is located in a position nearer to the non-regulating position (clockwise direction) with respect to the approximately central position of its pivoting stroke, the inversion spring 15 further biases it clockwisely.

Figure 4:
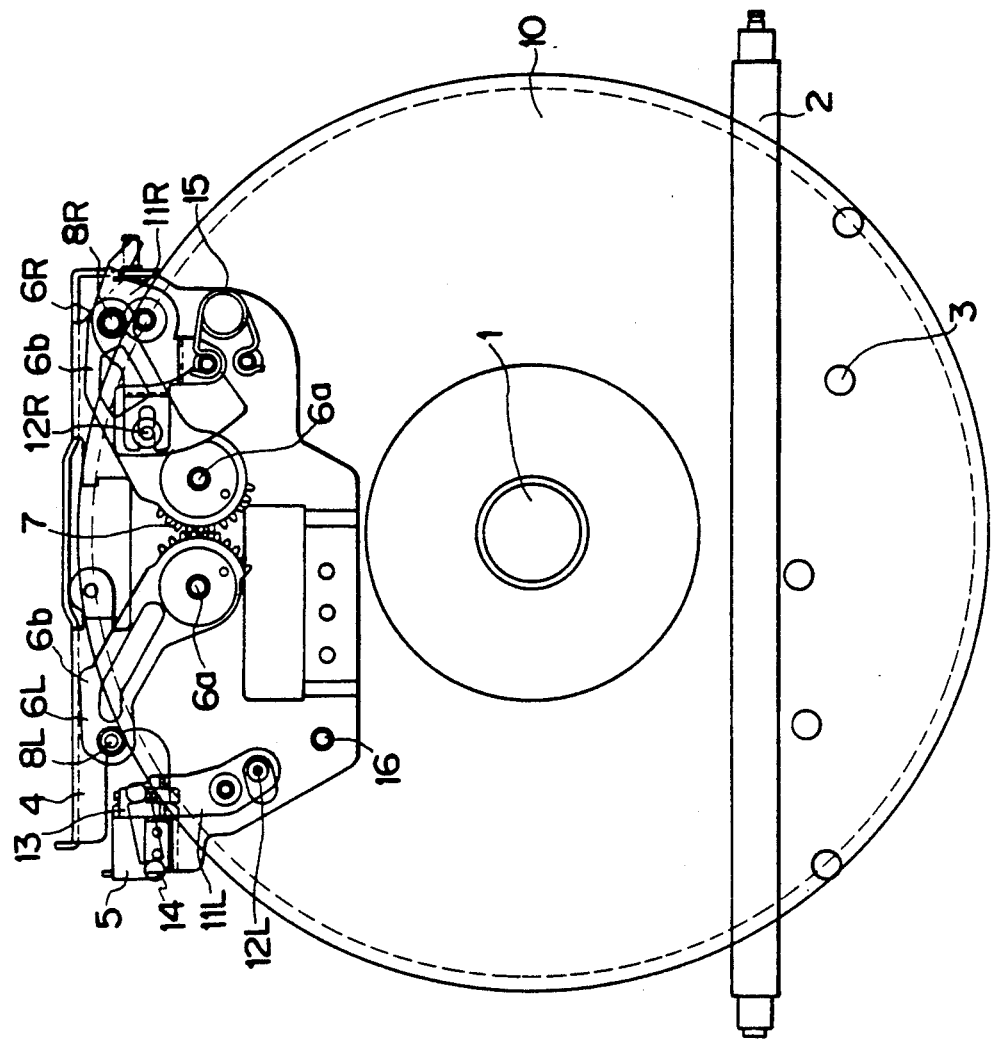
Figure 5:
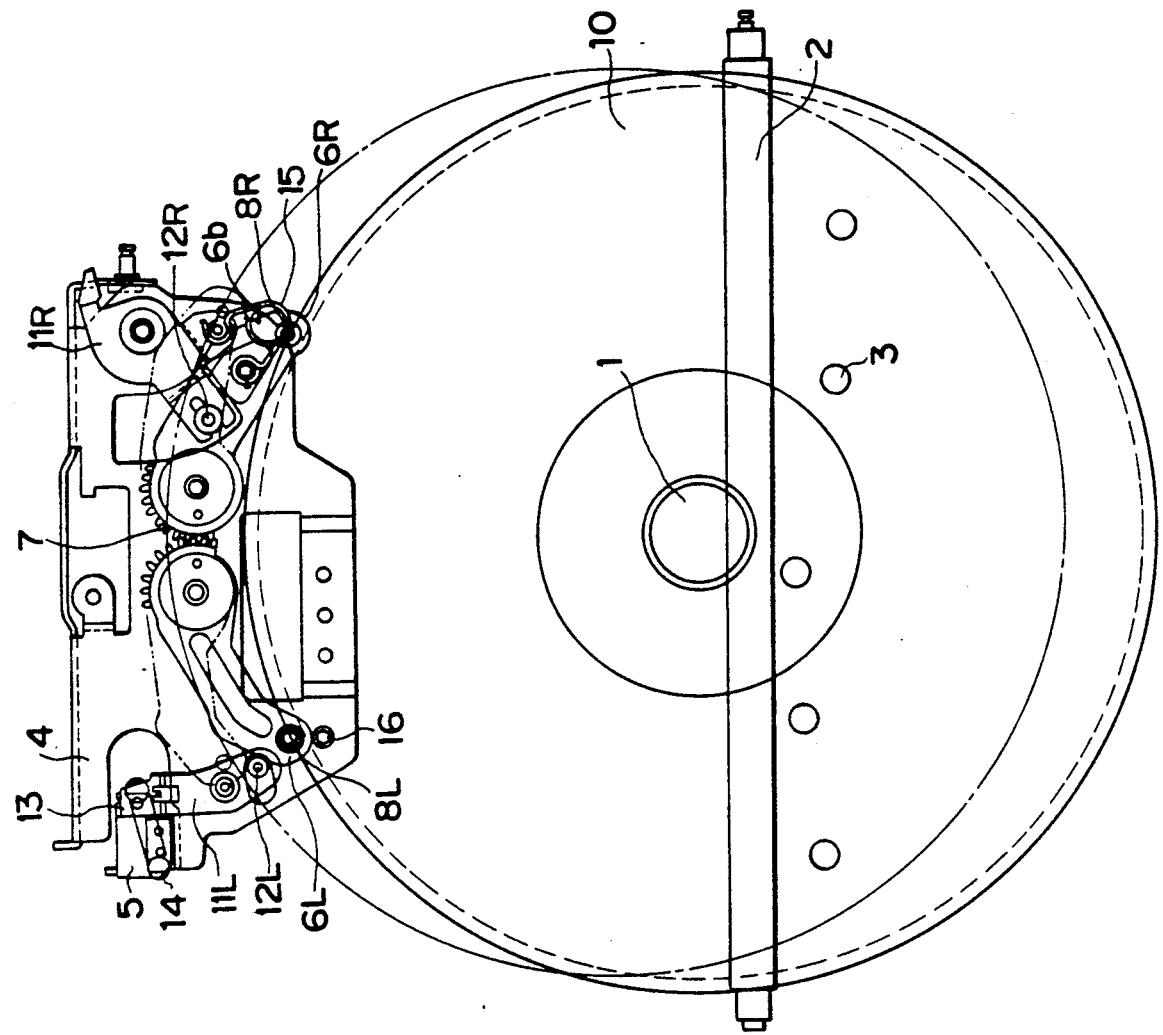

When the left and right stopper arms 6L and 6R pivot frontwardly, abutting portions 6b provided at front portions thereof engage a wall surface of the sub-chassis 4 as shown in FIGS. 4 and 5 to hold the stopper arms 6L and 6R in the front second operative positions and prevent their further frontward pivoting. Further, the left stopper arm 6L, as shown in FIGS. 2 and 3, is regulated in the first operative position by the pivoting regulating pin 12L from the front side thereof and is prevented by an arm stopper pin 16 fixed to the sub-chassis 4 from pivoting rearwardly of the first operative position.

In this embodiment, a specified size of the disc is judged, based on combinations of judging sensors which have actually detected insertion of the disc. More specifically, as shown in FIG. 7A, when both end sensors A and E among five judging sensors A through E simultaneously detect the disc, the disc is deemed to be the large-diameter disc 10, and in other cases, the disc is deemed to be the small-diameter disc 9. Discs of non-designated diameters other than the large-diameter disc 10 and the small-diameter disc 9 are judged depending on pattern acknowledgment of sensing timings of respective sensors. In this case, as shown in FIG. 8, when a disc of a non-designated diameter is detected, an ejection instruction is produced. The sensors A through E each consist of a pair of light emitting element 17 and a light receptor sensor 18.

The embodiment having the above-described arrangement operates as explained below.

(1) Loading Operation of Small-Diameter Disc

..., (FIG. 2, FIG. 3)→FIG. 1

When the small-diameter disc 9 is inserted in the disc loading mechanism, the judging sensors 3 or other detecting mechanism detect insertion of the disc. Responsively, a loading starting instruction is generated, the driving roller 2 is rotated, and the small-diameter disc 9 is conveyed forwardly of the mechanism. In this case, it is judged based on the detected pattern of the judging sensors 3 attendant to the movement of the small-diameter disc 9 whether the disc has the large diameter or the small diameter Before or when the judging sensors 3 judge it to be the small-diameter disc 9, the solenoid 5 is energized. For example, as shown in the flow chart of FIG. 8, the solenoid 5 may be first energized when the disc loading switch is turned on upon acknowledgment of insertion of the disc, and after judgment of the disc diameter, the solenoid may be maintained in the energized condition or otherwise deenergized.

The advanced small-diameter disc 9, if inserted from a left-sided position, abuts the left stopper pin 8L as shown in FIG. 2, and if inserted from a right-sided position, abuts the right stopper pin 8R as shown in FIG. 3. The stopper pin 8L or 8R is urged by the small-diameter disc 9 forwardly. However, since the solenoid 5 is in energized condition at this time, the left pivoting regulating plate 11L fixed to the movable member 13 is held by the magnetic force of the solenoid 5 in the pivoting regulating position (counterclockwise direction) shown in FIGS. 2 and 3, and holds the left stopper arm 6L in the rear first operative position. As a result, the right stopper arm 6R connected to the left stopper arm 6L by engagement of the gears 7 is also held in the rear first operative position similarly as the left stopper arm 6L.

Figure 1:
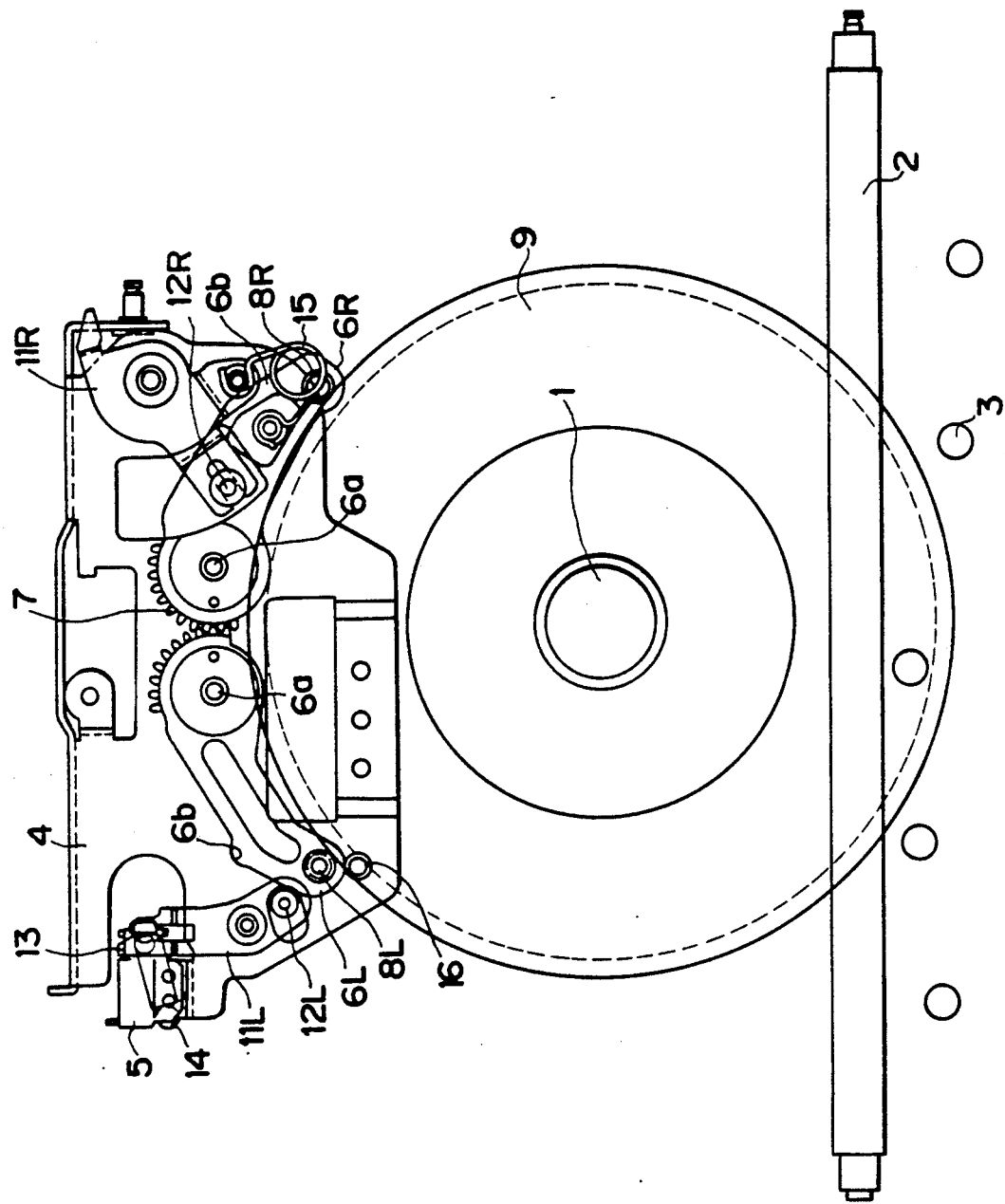

More specifically, at the time when the small-diameter disc 9 abuts the left (8L) or right (8R) stopper pin, both stopper pins 8L and 8R are fixed in the rear first operative positions. Therefore, the small-diameter disc 9 is further conveyed forwardly while pivoting about the stopper pin 8L or 8R until its front outer edge engages both stopper pins 8L and 8R, and it is set on the turn table 1. FIG. 1 shows the configuration upon completion of the loading.

(2) Loading Operation of Large-Diameter Disc

..., FIG. 5 →FIG. 4

Also when the large-diameter disc is inserted in the disc loading mechanism according to the embodiment, the driving roller 2 rotates in response to a loading starting instruction and conveys the large-diameter disc 10 forwardly of the mechanism in the same manner as in the small-diameter disc loading operation. In this case, it is judged by a pattern of the judging sensors 3 attendant the movement of the large-diameter disc 10 whether the disc has the large diameter or the small diameter. When it is acknowledged by the judging sensors 3 that the disc is the large-diameter disc 10, the solenoid 5 is not energized, or deenergized if it has been energized as shown in the example of FIG. 8.

The advanced large-diameter disc 10 abuts the left stopper pin 8L or the right stopper pin 8R as shown in FIG. 5, and urges them forwardly. Since the solenoid 5 is in the deenergized condition at this time, the left pivoting regulating plate 11L fixed to the movable member 13 is pivotable, and the left stopper arm 6L and the right stopper arm 6R connected thereto via gears 7 are also pivotable.

More specifically, at the time when the large-diameter disc 10 abuts the left (8L) or right (8R) stopper pin, the left and right stopper arms 6L and 6R carrying these stopper pins 8L and 8R are both pivotable. Therefore, the large-diameter disc 10 urges the stopper arms 6L and 6R through the engaging stopper pins 8L and 8R, and pivots them forwardly. In the first half of the motion of the left stopper arm 6L, the left pivoting regulating plate 11L engages the stopper arm 6L and is urged thereby for clockwise rotation against the spring 14. However, in the second half of the motion of the left stopper arm 6L, it is disengaged therefrom, and returns to the counterclockwise position under the energy of the spring 14. Further, in the first half of the motion of the right stopper arm 6R, the right pivoting regulating plate 11R engages the stopper arm 6R and is urged thereby for clockwise rotation against the inversion spring 15. However, after the inversion spring 15 is inverted, the right pivoting regulating plate 11R pivots clockwisely under the energy of the inversion spring 15.

The large-diameter disc 10, having advanced while urging the left and right stopper arms 6L and 6R, finally stops together with the left and right stopper arms 6L and 6R when the abutting portions 6b of the stopper arms 6L and 6R engage the wall surface of the sub-chassis 4, and the disc 10 is set on the turn table 1. FIG. 4 shows the configuration upon completion of the loading.

(3) Disc Unloading Operation

Unloading operation of the small-diameter disc 9 is effected by reversely rotating the driving roller 2 in the configuration of FIG. 1. Unloading operation of the large-diameter disc 10 is effected by reversely rotating the driving roller 2 in the configuration of FIG. 4 and concurrently pivoting the right pivoting regulating plate 11R counterclockwisely by another mechanism. When the right pivoting regulating plate 11R pivots counterclockwisely, the left and right stopper arms 6L and 6R pivot in the disc ejecting direction, and the left pivoting regulating plate 11L moves along the outer margin of the left stopper arm 6L, whereby respective members finally return to position of FIG. 1.

As described above, the disc loading mechanism according to the embodiment can automatically load and unload large and small two kinds of discs under a simple arrangement and a simple operation, and does not require an adapter used in the existing mechanism.

The specific embodiment referred to above should not be construed to limit the invention thereto, but various alternative arrangements may be selected for the disc size judging means and for the position regulating arrangement from the solenoid to the stopper arms. Further, the invention is not limited to a CD Player but may be widely used in other disc players using two or more sizes of discs.

As described above, the invention provides a disc loading mechanism with an excellent operability and a simple arrangement capable of automatically conveying two or more kinds of discs having different sizes and setting them on the same turn table, under a simple arrangement using the disc size judging means, stopper arms and stopper arm regulating means, and not using an adapter required in the existing mechanism.

What is claimed is:

1. A disc loading mechanism, comprising: a turntable supported for rotation about an axis of rotation; conveyor means for conveying a circular disc from a location spaced radially from said turntable in an insertion direction toward said turntable; judging means for determining the diameter of the disc as the disc is being conveyed by said conveyor means; and stopper means engageable with the disc as the disc is moved by said conveyor means for halting movement of the disc in said insertion direction, said stopper means including a first stopper portion which can move approximately parallel to said insertion direction from a first position to a second position, wherein the disc conveyed by said conveyor means engages said first stopper portion and urges said first stopper portion to move in said insertion direction, said stopper means being responsive to said judging means for respectively permitting and obstructing movement of said first stopper portion by the disk from said first position to said second position when said judging means respectively detects that the disc has a first size and a second size, said first stopper portion halting movement of the disc in a position in which an axis of the disc is substantially aligned with said axis of rotation of said turntable.

2. A disc loading mechanism as recited in claim 1, wherein said stopper means includes a further stopper portion which is spaced from said first stopper portion, and which is movable approximately parallel to said insertion direction between first and second positions, said stopper means respectively permitting and obstructing movement of said further stopper portion from its first position to its second position when respectively permitting and obstructing movement of said first stopper portion from its first to its second position, said stopper portions engaging an edge portion of a disc at respective circumferentially spaced locations.

3. A disc loading mechanism as recited in claim 2, wherein said stopper means includes two separate stopper members which are each movably supported and which each have thereon a respective one of said stopper portions.

4. A disc loading mechanism as recited in claim 3, wherein said stopper members are each supported at one end for pivotal movement about a respective pivot axis extending approximately parallel to said axis of rotation, said stopper portion of each said stopper member being spaced radially from said pivot axis thereof in a direction approximately normal to said insertion direction.

5. A disc loading mechanism as recited in claim 4, wherein each said stopper member has thereon an arcuate gear portion concentric to said pivot axis thereof, said gear portions of said stopper members being in meshing engagement to thereby effect synchronous pivotal movement of said stopper members.

6. A disc loading mechanism as recited in claim 1, including a movably supported stopper member having said first stopper portion thereon, said stopper means including a regulating member supported for movement between first and second positions in which said regulating member is respectively disposed in and spaced from a path of movement of said stopper member from its first to its second position in order to respectively obstruct and permit movement of said stopper member away from said first position thereof, and means for moving said regulating member between its second and first positions in response to determinations by said judging means that a disc respectively has said first size and said second size.

7. A disc loading mechanism as recited in claim 6, wherein said means for moving said regulating member includes a solenoid which is controlled by an output signal from said judging means and which has a movable operating member operationally coupled to said regulating member.

8. A disc loading mechanism according to claim 7, wherein said regulating member is pivotally supported at a location between its ends, one end of said regulating member being coupled to said operating member of said solenoid and the other end of said regulating member being movable into and out of said path of travel of said stopper member.

9. A disc loading mechanism as recited in claim 6, wherein said stopper member passes through a third position as it travels from its first position to its second position, and wherein said stopper means includes reversing means for resiliently urging said stopper member toward its first position when said stopper member is between its first and third positions and toward its second position when said stopper member is between its second and third positions.

10. A disc loading mechanism as recited in claim 9, wherein said stopper means includes a further movably supported stopper member having thereon a stopper portion engageable with said disc, said stopper members each being supported for pivotal movement about a respective pivot axis and having said stopper portion thereon spaced from said pivot axis in a direction transverse to said insertion direction; said stopper means further including means for effecting movement of said further stopper member between first and second positions synchronously with movement of said first-mentioned stopper member between its first and second positions; and wherein said reversing means is operationally coupled to said further stopper member.

11. A disc loading mechanism as recited in claim 10, wherein said reversing means includes a further regulating member which is supported for pivotal movement about a stationary pivot axis, said further regulating member and said further stopper member being pivotally coupled to each other at a location spaced from said pivot axes thereof, said further regulating member moving from a first position to a second position as said further stopper member moves from its first position to its second position, and said further regulating member moving through a third position as it travels from its first to its second position, and said reversing means including reversing spring means operationally coupled to said further regulating member for resiliently urging said further regulating member toward its first position when said further regulating member is between its first and second positions and for resiliently urging said further regulating member toward its second position when said further regulating member is between its second and third positions.

12. A disc loading mechanism as recited in claim 11, wherein said reversing spring means includes a reversing spring having a first leg which is supported on a stationary pin and having a second leg supported on a pin provided on said further regulating member, wherein as said further regulating member pivots from its first to its second position said pin thereon moves through a position in which it is disposed between said stationary pin and said pivot axis of said further regulating member.

* * * * *